April 19, 1960     A. F. DERSE, SR     2,933,322
HAND TRUCKS
Filed May 8, 1958     2 Sheets-Sheet 1
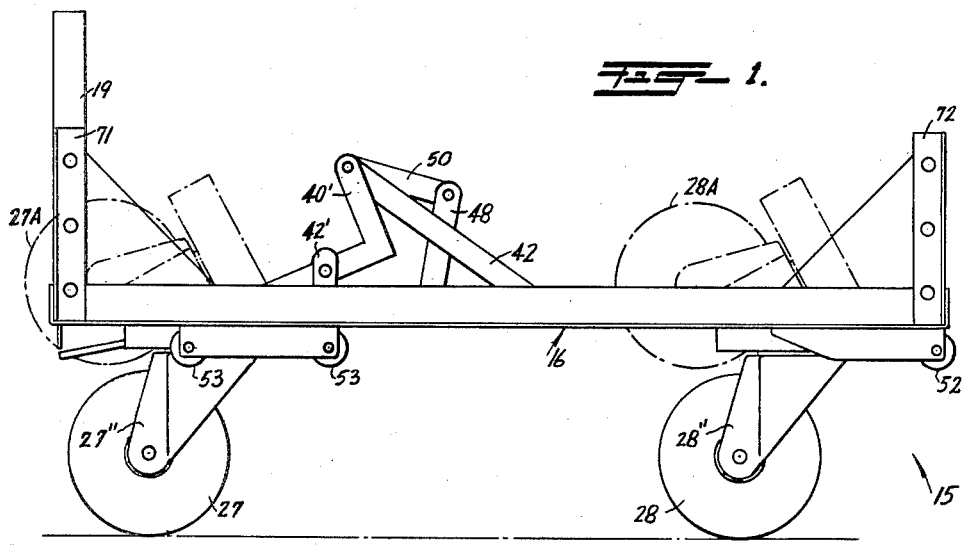
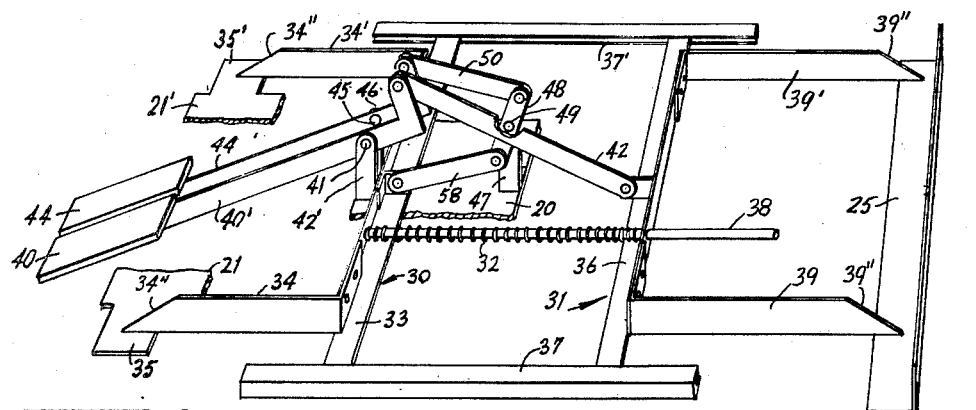
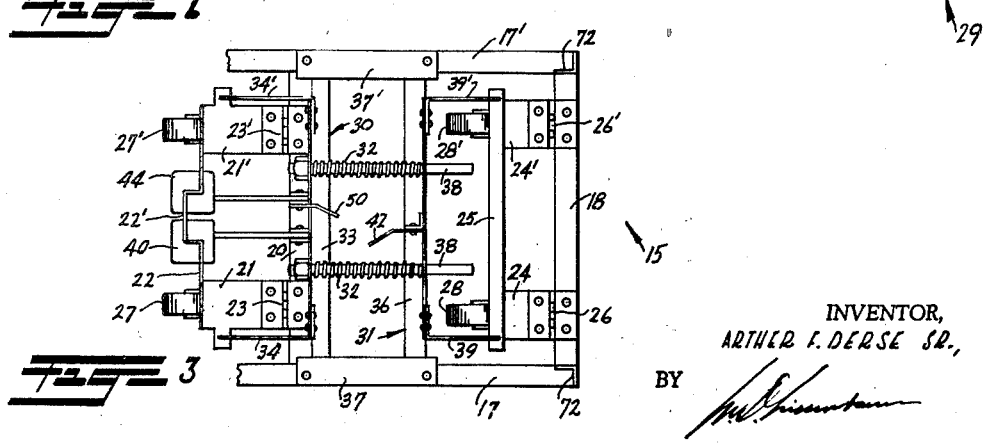
INVENTOR,
ARTHER F. DERSE SR.,
BY
ATTORNEY

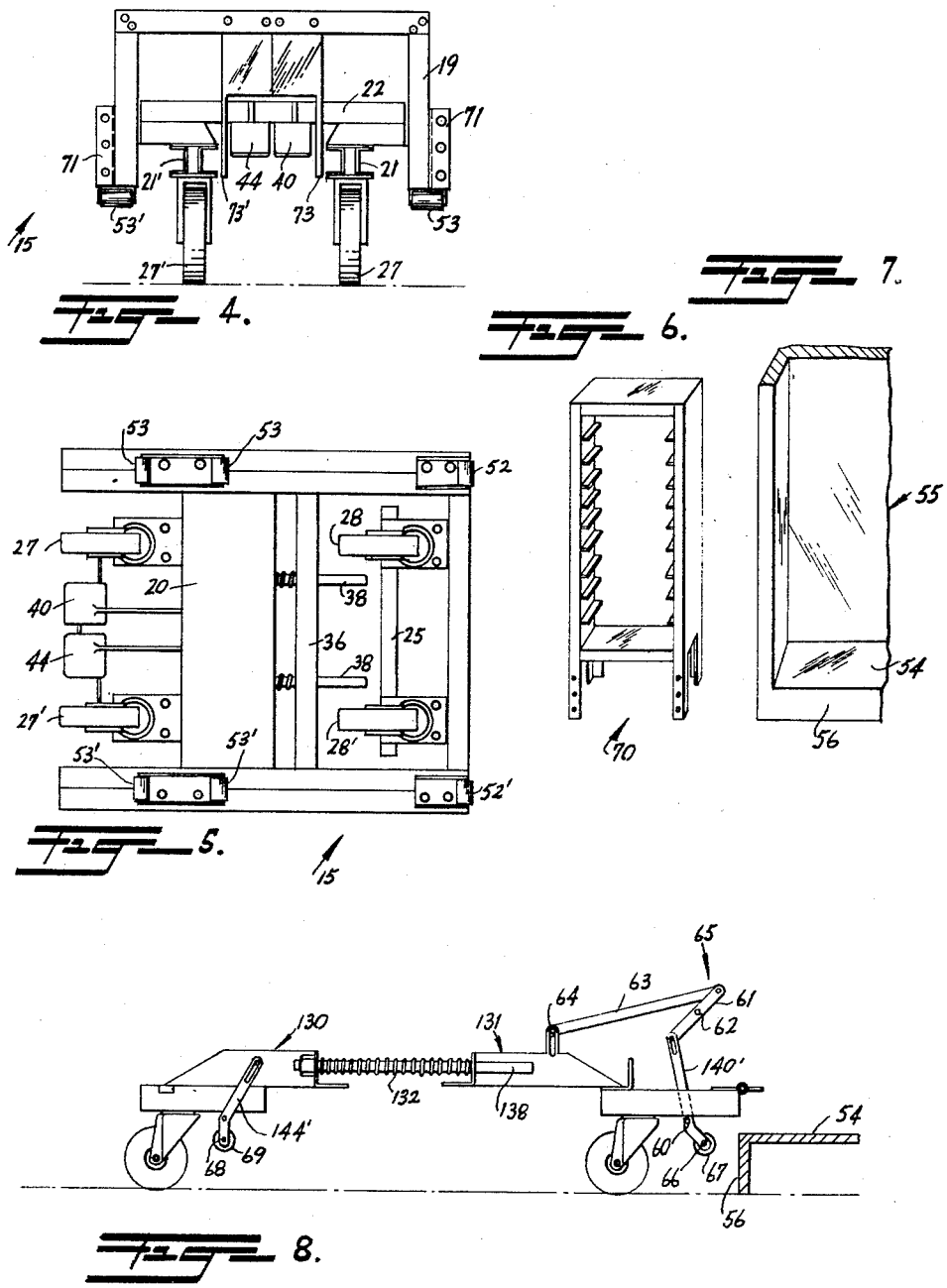

United States Patent Office 2,933,322
Patented Apr. 19, 1960

2,933,322

HAND TRUCKS

Arthur F. Derse, Sr., Deerpark Township, Orange County, N.Y., assignor to Wilder Mfg. Co., Inc., Port Jervis, N.Y., a corporation of New York Application May 8, 1958, Serial No. 734,034

5 Claims. (Cl. 280—5.2)

The present invention relates to trucks which are moved about by hand.

As a matter of example, in bakeries, laden trays set as shelves on a frame rack, need be placed as a unit into a refrigerator. In approved refrigerator construction, its floor is one step up.

It is therefore the principal object of this invention to provide a novel and improved truck structure which can be easily moved with its load into such a refrigerator.

A further object thereof is to provide a novel and improved truck of the character mentioned, involving manually-operated mechanism which allows said truck to be pushed to rest one step up from floor level, and in another embodiment, I provide that said mechanism operate automatically so that all that is necessary is merely to push the truck to get it to rest atop the step.

Still a further object thereof is to provide a novel and improved truck structure of the type set forth which is simple in construction, reasonably cheap to manufacture, easy to use and efficient in carrying out the purpose for which it is designed.

Other objects and advantages will become apparent as this disclosure proceeds.

For the practice of this invention, one form it may assume, is to have a truck frame with front wheels retractable upwardly as a unit and rear wheels retractable upwardly as a unit; such units co-operating with spring latch means respectively which are pedal-operated to release such units to be free to swing upwardly and which automatically engage said units when in operative position, that is, when said wheels are in their downward position with respect to the frame. The entire frame, when such wheels are on the ground, is above step level. Auxiliary wheels or rollers are at each side near the front of the frame and journalled thereon. Also, auxiliary wheels or rollers are similarly positioned and mounted at the very rear of the frame; the under surface of such auxiliary rotatable members being tangent to the plane of the step or slightly higher, when the main wheels rest on the floor. When the main wheels are forward and free of the step, their weight causes them to swing downwardly to operative position, and in such downward movement, the spring latches are automatically shifted to permit the full downward fall of the main wheels, whereupon such latches shift to lock the main wheels against retraction. In the embodiment where the operation is fully automatic, instead of the pedals, upwardly swingable arms which come into contact with the step's riser, effect latch operation to release the main wheels for retraction.

A detailed description of these structures and their modes of operation, follow.

In the accompanying drawings forming part of this specification, similar characters of reference indicate corresponding parts in all the views.

Fig. 1 is a side elevational view of a truck structure embodying the teachings of this invention.

Fig. 2 is a perspective view, partly fragmentary, showing the manually-operated latch mechanism.

Fig. 3 is a fragmentary top plan view of Fig. 1.
Fig. 4 is a front view of Fig. 1.
Fig. 5 is a botton view of Fig. 1.
(Figs. 3–5 are drawn to a reduced scale.)

Fig. 6 is a perspective view showing a rack structure to be mounted atop the truck of Fig. 1.

Fig. 7 is a fragmentary perspective view of a refrigerator's interior into which the truck and its load are to be set.

(Figs. 6 and 7 are drawn to a much reduced scale.)

Fig. 8 is a fragmentary side elevation of modified truck structure, the retraction of whose main wheels is accomplished automatically upon pushing the truck onto the step.

In the drawings, the numeral 15 designates generally the manually-operated truck structure. It consists of a rectangular frame denoted generally as 16, having the side members 17, 17', a rear member 18, a front member 19 and the intermediate cross member 20. The numerals 21, 21' indicate normally horizontal beam members joined at their front by the cross member 22 and hinged at their rear top regions to the intermediate cross member 20 of the frame, by the hinges 23, 23' respectively for swinging movement about a common horizontal axis line across the frame. The numerals 24, 24' indicate normally horizontal beam members joined at their front by the cross member indicated generally as 25 and hinged at their rear top regions to the rear frame member 18, by the hinges 26, 26' respectively for swinging movement about a common horizontal axis line across the frame. The beam members 21, 24 are within the frame along the side member 17. The beam members 21', 24' are within the frame along the side member 17'. Downwardly from near the front regions of each of said beam members, are brackets with revolvable wheels thereon; such wheels being the front wheels 27, 27' and the rear wheels 28, 28' which are the main wheels of the truck 15. The brackets 27", 28" are swively mounted on the respective beam members for rotation about vertical axes. When the wheels 27, 27' are parallel along the truck, their axes of rotation are colinear. When the wheels 28, 28' are parallel along the truck, their axes of rotation are colinear.

The latching mechanism is designated generally by the numeral 29. It serves to hold the beam members 21, 21', 24, 24' against upward swinging so that their associated wheels 27, 27', 28, 28' roll on the floor. Manipulation of such mechanism frees said beam assemblies for swinging movement as will be explained. Such mechanism includes a latch indicated generally by the numeral 30 for control of the front wheel assembly and a latch denoted generally by the numeral 31 for control of the rear wheel assembly. These are spring latches biased by one or more compression coil springs 32. The front latch 30 comprises a member of angle iron 33 having the forwardly extending arms 34, 34' which end on and rest atop the respective lateral lugs 35, 35' extending from the beam members 21, 21' respectively. The rear latch 31 comprises a member of angle iron 36 having the rearwardly extending arms 39, 39' which end on and rest atop the cross member 25. This condition of the mechanism exists when the wheels are on the floor as shown in full lines in Fig. 1. The members 33 and 36 are in spaced relation across the frame with their ends engaged on the side frame members 17, 17' whereby such cross members are movable laterally along said side frame members. Any suitable track means, as for instance the channels 37, 37' along said frame members, may be used for such purpose. The forward end face of each of the arms 34, 34' slopes forwardly downwardly as at 34" to act as a cam. The rearward end face of each of the arms 39, 39' slopes rearwardly downwardly as at 39″ to act as a cam. Each spring 32 is about a rod 38 and is stressed in compression. The rods 38 are secured to cross member 33 and are free to slide in appropriate holes in the cross member 36.

It is evident that in order to free the front wheel assembly for swinging movement, the latch 30 must be moved rearwardly until the arms 34, 34′ are clear of the lugs 35, 35′ respectively, and in order to free the rear wheel assembly for swinging movement, the latch 31 must be moved forwardly until the arms 39, 39′ are clear of the cross member 25.

All mechanism thus far described is the same for the manually-operated embodiment shown in Fig. 1 and for the fully automatic embodiment shown in Fig. 8. Corresponding parts in said embodiments are numbered in such manner that the designation of a part in Fig. 8 is 100 more than the numeral it is denoted by in Fig. 1.

To accomplish unlocking latch movement of 31, a foot pedal 40 is pushed downward, suitable linkage being brovided to effect forward movement of latch 31 when said pedal 40 is pushed down. Such linkage is effected by having pedal lever 40′ swingably mounted intermediate its ends at 41 to a standard 42′ which extends upwardly from the intermediate cross bar 20 and a link 42 is pivotally secured at its ends to said pedal lever 40′ and to the cross member 36. To accomplish unlocking latch movement of 30, a foot pedal 44 is pushed downward, suitable linkage being provided to effect rearward movement of latch 30 when said pedal 44 is pushed down. Such linkage is effected by having pedal lever 44′ swingably mounted intermediate its ends at 45 to a standard 46 which extends upwardly from the intermediate cross member 20. There is a standard 47 extending upwardly from said cross member 20 between the latches 30, 31. A link 48 is pivotally mounted intermediate its ends at 49 to said standard 47. A link 58 is pivotally secured at its ends to one end of the link 48 and the cross bar 33 respectively and there is a link 50 pivotally secured at its ends to the pedal lever 44′ and the other end of the link 48. This describes the pedal and linkage arrangement for the manually-operated embodiment shown in Fig. 1. It will be readily understood by those versed in mechanisms, without the need of any further illustration, that instead of foot pedals, handles extending upwardly from the levers 40′, 44′ respectively may be provided so that the spring latch mechanism of Fig. 2 may be manipulated by hand instead of by foot.

Before explaining the means for automatic operation as taught in the construction shown in Fig. 8, mention need be made that the truck frame 16 at its very rear, carries underneath it at each side, the auxiliary rollers 52, 52′ respectively, and near the front, said truck frame similarly has the auxiliary rollers 53, 53′ as shown in Figs. 1, 4, 5 and 8. Dimensions are such that when the truck is standing on its main wheels on the floor as shown in Figs. 1 and 8, the plane tangent to the underside of the auxiliary rollers is slightly above the floor 54 of the refrigerator 55. Although this floor 54 is shown level, the floor in most commercial refrigerators is sunk below the top edge of the riser 56. In such instance, a proper platform (not shown) need be securely placed at the bottom of the refrigerator to give a floor therein which is at step level for the rollers 52, 52′ and then the rollers 53, 53′, to ride on.

Referring now to Fig. 8, to accomplish unlocking latch movement of 131 and then of 130, pivoted levers 140′ and 144′ are shifted respectively when their lower ends contact the riser 56 and the truck is pushed into the refrigerator 55. The lever 140′ is pivoted intermediate its ends on an axis 60 on the frame of the truck structure. A lever 61 is pivoted intermediate its ends on an axis 62 on said frame. One end of a link 63 is pivotally mounted at 64 to the latch 131, and its other end to one end of the lever 61. The upper end of lever 140′ is slidably pivotally connected to the other end of said lever 61. It is practical to have one such linkage indicated generally by the numeral 65, associated with each cam arm of the latch 131 and the lower ends of the then set of two levers 140′ connected by a shaft 66 carrying an elongated roller 67 for contact with the step's riser 56. To accomplish unlocking latch movement of 130, the pivoted lever 144′ at its upper end, is slidably pivotally linked to the latch, and preferably one such arrangement at each side with each cam arm of latch 130, in which instance the then set of two levers 144′ are connected by a shaft 68 carrying an elongated roller 69 for contact with the step's riser 56.

The rack 70 for carrying laden racks as shelves thereon, may be permanently attached by bolts and nuts or rivets to the corner angle brackets 71, 72.

I will now describe the operation of the embodiment shown in Figs. 1–5. The laden truck 15 is pushed to a position in front of the refrigerator 55 so that the rear end of such truck is at the step's riser 56 and capable upon further pushing, to enter the refrigerator. The rear rollers 52, 52′ extend into the refrigerator and either contact or nearly contact the refrigerator's floor 54. Now the operator steps with his foot on pedal 40 and pushes it downward, thereby causing the rear latch 31 to move forward and thereby release the rear wheel structure for upward swinging to retracted position indicated at 28A, which occurs upon pushing the truck 15 into the refrigerator so that the step's riser 56 acts on the rear wheels 28, 28′ to lift them. When the front wheels 27, 27′ contact the riser 56, the operator presses with his foot on the pedal 44, thereby causing the front latch 30 to move rearward and thereby release the front wheel structure for upward swinging to the retracted position indicated at 27A, which occurs upon pushing the truck further into the refrigerator so that the step's riser 56 acts on the front wheels to lift them. It is to be noted that the front of the truck will rest on the front rollers 53, 53′ when in the refrigerator. The truck 15 is pushed further into the refrigerator as clear space therein will allow, or to any desired place therein.

It is to be noted that upon release of the respective foot levers 40 and 44, the action of the springs 32 will automatically restore the latch means 31 and 30 to normal locking position. Upon pulling the truck forward end first out of the refrigerator 55, the front wheels 27, 27′ and their associated unitary structure hinged at 23, 23′ become free to swing downwardly by action of gravity. When such downward swing happens, the lateral lugs 35, 35′ in coming in contact with the cams 34″ of the front latch 30, will cause rearward movement of such front latch until said lugs are below the latch arms 34, 34′, whereupon the stressed springs 32 will again shift the front latch 30 forwardly and lock the front wheel structure whereby the truck 15 rides on the front wheels 27, 27′ and the rear roller means 52, 52′. Now, upon pulling the truck further out of the refrigerator, the rear wheels 28, 28′ and their associated unitary structure hinged at 26, 26′ become free to swing downwardly by action of gravity. When such downward swing happens the cross member 35 in coming in contact with the cams 39″ of the rear latch 31, will cause forward movement of such rear latch until the cross member 25 is below the latch arms 39, 39′, whereupon the stressed springs 32 will again shift the rear latch rearwardly and lock the rear wheel unitary structure whereupon the truck 15 again rides on the rear wheels 28, 28′. The truck now rides with its wheels on the floor. Dimensions are so chosen that the distance between the floor and the plane tangent to the underside of the rollers 52, 52′, 53, 53′ is slightly more than the height of the riser 56, when the truck 15 is in the condition shown in Fig. 1 in full lines.

As to the operation of the embodiment shown in Fig. 8, where the action is fully automatic to retract the wheels when the truck is pushed rear end first into the refrigerator, and to have the wheels restored again to their position as illustrated in said Fig. 8, it is evident that the action of the riser 56 on the roller 67 and then on the roller 68, will accomplish automatic wheel retraction, when the truck is pushed into the refrigerator and as in the embodiment of Fig. 1, gravity will cause the restoration to initial condition when the truck is withdrawn from the refrigerator. For retraction, the roller 67 serves in place of the lever 40', and the roller 68 serves in place of the lever 44'.

It might be noted that when the front wheels are retracted to position 27A, the cross member 22 need clear the linkage of the latch mechanism 29. Hence said cross member has a forwardly extending mid-section as at 22' to effect such clearance. Also, that the front wheels 27, 27' be in proper forwardly rolling position when the truck is withdrawn from the refrigerator 55, the front of the truck frame is provided with the guides 73, 73', which in cooperation with the frame, hold the front wheels from undue swivel turn, while in retracted position 27A.

This invention is capable of numerous forms and various applications without departing from the essential features herein disclosed. It is therefore intended and desired that the embodiments shown herein shall be deemed illustrative and not restrictive and that the patent shall cover all patentable novelty herein set forth; reference being had to the following claims rather than to the specific description herein to indicate the scope of this invention.

I claim:

1. In a hand truck of the character described adapted to be moved on a floor and then onto a step up from the floor and finally back onto the floor, a frame, front and rear structures having depending wheels rotatably mounted about horizontal axes thereon respectively whereby the truck can be rolled on the floor; the undersides of said wheels being normally below the frame and tangent to a common horizontal plane; said wheel-carrying structures being swingably mounted on the frame about parallel horizontal axes rearward of the front ends of said structures respectively; said front ends being towards the front end of the frame, first roller means mounted on the frame rearward of the rear wheels, second roller means mounted on the frame at the front region of the frame between the front and rear wheels; the undersides of the wheels being normally below the undersides of the rollers a distance equal at least and substantially that of the height of the step from the floor where the truck is to be used, first latch means holding the front-wheel carrying structure against swinging movement, second latch means holding the rear wheel-carrying structure against swinging movement, first means movable to shift the first latch means to release the front wheel-carrying structure for swinging movement, second means movable to shift the second latch means to release the rear wheel-carrying structure for swinging movement; said latch-shifting means being mounted on the frame; said latches being reciprocatably mounted on the frame for movement in a direction along the frame; the rear wheel-carrying structure being released for swinging movement to raise its associated wheels, upon movement of the rear latch towards the front of the frame; the front wheel-carrying structure being released for swinging movement to raise its associated wheels, upon movement of the front latch towards the rear of the frame and at least one spring; said spring acting on both latches simultaneously to urge said latches apart when either latch is moved to release its associated wheel-carrying structure; said rollers being rotatably mounted about horizontal axes on the frame and the undersides of said rollers being tangent to a common horizontal plane below the frame and capable of supporting the truck for movement on such plane and such plane being below the latch and latch-shifting means and the wheel-carrying structures when the wheels and rollers stand on such plane; the axes of rotation of the wheels and rollers being parallel to the axes of swing of the wheel-carrying structures.

2. A hand truck as defined in claim 1, wherein each latch is provided with a cam adapted to be contacted by the wheel-carrying structure associated with same, when such structure swings to lower its wheels after such structure was swung to raise its wheels, whereby the associated latch is automatically shifted to allow said structure to swing to lower its wheels and thereupon by action of said spring is automatically shifted to reengage said structure against upward movement of its wheels.

3. A hand truck as defined in claim 1, wherein each of the latch-shifting means includes a manually-operated operating member accessible at the front of the frame.

4. A hand truck as defined in claim 1, wherein each of the latch-shifting means includes an operating pedal accessible at the front of the frame.

5. A hand truck as defined in claim 1, wherein each spring is a compression coil spring and including one rod for each spring; each of said rods being secured to one of the latches and slidably mounted on the other of said latches; each rod carrying one of said springs between said latches; each rod being through a spring.

References Cited in the file of this patent

UNITED STATES PATENTS

| 1,785,646 | Pascoo | Dec. 16, 1930 |
| 2,123,707 | Bloch | July 12, 1938 |
| 2,498,504 | Quayle | Feb. 21, 1950 |

FOREIGN PATENTS

| 168,395 | Austria | May 25, 1951 |
| 932,361 | France | Nov. 24, 1947 |